(12) United States Patent
Yang et al.

(10) Patent No.: US 10,915,796 B2
(45) Date of Patent: Feb. 9, 2021

(54) ID ASSOCIATION AND INDOOR LOCALIZATION VIA PASSIVE PHASED-ARRAY AND COMPUTER VISION MOTION CORRELATION

(71) Applicant: DISNEY ENTERPRISES, INC., Burbank, CA (US)

(72) Inventors: Chouchang Yang, Pittsburgh, PA (US); Alanson Sample, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 46 days.

(21) Appl. No.: 16/175,727

(22) Filed: Oct. 30, 2018

(65) Prior Publication Data

US 2020/0134395 A1   Apr. 30, 2020

(51) Int. Cl.

| | |
|---|---|
| *G06K 9/62* | (2006.01) |
| *G06T 7/73* | (2017.01) |
| *G06K 9/00* | (2006.01) |
| *H04N 5/247* | (2006.01) |
| *G06T 7/50* | (2017.01) |
| *G06T 7/292* | (2017.01) |
| *G06T 7/246* | (2017.01) |
| *G01S 5/02* | (2010.01) |
| *G01S 3/46* | (2006.01) |
| *G01S 11/06* | (2006.01) |
| *H04W 4/029* | (2018.01) |
| *H04N 13/204* | (2018.01) |

(52) U.S. Cl.
CPC ............. *G06K 9/6288* (2013.01); *G01S 3/46* (2013.01); *G01S 5/0257* (2013.01); *G01S 11/06* (2013.01); *G06K 9/00362* (2013.01); *G06T 7/246* (2017.01); *G06T 7/292* (2017.01); *G06T 7/50* (2017.01); *G06T 7/73* (2017.01); *H04N 5/247* (2013.01); *H04W 4/029* (2018.02); *G06K 9/6217* (2013.01); *G06T 2207/10021* (2013.01); *G06T 2207/30196* (2013.01); *H04N 13/204* (2018.05)

(58) Field of Classification Search
None
See application file for complete search history.

(56) References Cited

U.S. PATENT DOCUMENTS

| | | | | |
|---|---|---|---|---|
| 8,160,569 | B1 * | 4/2012 | VanLaningham | ... H04W 64/006 455/422.1 |
| 8,781,495 | B1 * | 7/2014 | Gold | ..... G01S 5/0252 455/456.1 |
| 9,610,476 | B1 * | 4/2017 | Tran | ........ A63B 60/46 |
| 2003/0235164 | A1 * | 12/2003 | Rogers | ........ H04W 48/16 370/331 |

(Continued)

*Primary Examiner* — Pankaj Kumar
*Assistant Examiner* — Timothy R Newlin
(74) *Attorney, Agent, or Firm* — Snell & Wilmer L.L.P.; Kent A. Lembke

(57) ABSTRACT

A system and method for combining computer vision information about human subjects within the field-of-view of a computer vision subsystem with RF Angle of Arrival (AoA) information from an RF receiver subsystem to locate, identify, and track individuals and their location. The RF receiver subsystem may receive RF signals emitted by one or more electronic devices (e.g., a mobile phone) carried, held, or otherwise associated with am individual. Further, gestures can be made with the device and they can be detected by the system.

20 Claims, 13 Drawing Sheets

(56) References Cited

U.S. PATENT DOCUMENTS

| | | | |
|---|---|---|---|
| 2004/0130620 A1* | 7/2004 | Buehler | G06K 9/00335 348/143 |
| 2004/0155958 A1* | 8/2004 | Lee | H04N 7/18 348/143 |
| 2005/0197923 A1* | 9/2005 | Kilner | G06K 9/00771 382/118 |
| 2006/0222209 A1* | 10/2006 | Zhang | G06K 9/00771 382/107 |
| 2012/0276918 A1* | 11/2012 | Krattiger | H01Q 1/007 455/456.1 |
| 2013/0115969 A1* | 5/2013 | Holmes | G06Q 30/02 455/456.1 |
| 2014/0139633 A1* | 5/2014 | Wang | G06K 9/00201 348/46 |
| 2014/0379296 A1* | 12/2014 | Nathan | G06Q 10/08 702/150 |
| 2015/0087331 A1* | 3/2015 | Yang | G01S 5/12 455/456.1 |
| 2015/0263424 A1* | 9/2015 | Sanford | H01Q 3/46 342/371 |
| 2015/0294193 A1* | 10/2015 | Tate | G06K 9/00785 382/159 |
| 2015/0341719 A1* | 11/2015 | Sun | H04R 1/32 381/92 |
| 2016/0007315 A1* | 1/2016 | Lundgreen | G01S 3/46 455/67.11 |
| 2016/0148057 A1* | 5/2016 | Oh | H04N 7/183 348/143 |
| 2016/0334498 A1* | 11/2016 | Jamieson | G01S 3/48 |
| 2017/0061204 A1* | 3/2017 | Kuwabara | G06Q 30/02 |
| 2017/0186291 A1* | 6/2017 | Wenus | G08B 13/19608 |
| 2017/0193772 A1* | 7/2017 | Kusens | H04N 7/183 |
| 2018/0025498 A1* | 1/2018 | Omari | G01C 21/165 348/144 |
| 2019/0035104 A1* | 1/2019 | Cuban | G06T 7/20 |
| 2019/0053124 A1* | 2/2019 | Bitra | H04W 12/00502 |
| 2019/0098220 A1* | 3/2019 | Liv | G01S 5/04 |
| 2019/0182790 A1* | 6/2019 | Kothari | G01S 5/0252 |

* cited by examiner

ID ASSOCIATION AND INDOOR LOCALIZATION VIA PASSIVE PHASED-ARRAY AND COMPUTER VISION MOTION CORRELATION

BACKGROUND

In recent years, interactive games and experiences and other types of visitor entertainment and services have been developed for amusement parks to increase the engagement and enjoyment of park visitors. As part of this, it can be desirable to track the precise location of park visitors as they move about and experience the amusement park.

To date, approaches for tracking individuals have included technologies such as GPS, RFID, and BLE (Bluetooth Low Energy). All such approaches have suffered from a lack of sufficient precision and/or a need to have each individual voluntarily wear or carry an object (e.g., a wristband, badge, or other device that contained an RFID chip or the like).

It is against this background that the techniques described herein have been developed.

SUMMARY

Disclosed herein is a system for identifying and tracking the location of human subjects. The system includes an RF receiver subsystem that includes a phased array antenna of multiple antenna elements, wherein the RF receiver subsystem receives RF signals emitted from at least one electronic device worn or carried by a human subject, the RF receiver subsystem detecting identifying information in the received RF signals from the human subject so as to be able to distinguish the human subject from other human subjects, and the RF receiver subsystem determining the Angle of Arrival (AoA) of the received RF signals. The system also includes a computer vision subsystem that includes at least one camera to generate image information based on a scene viewed by the camera, the computer vision subsystem processing the image information to identify one or more human subjects in the scene, and to determine the angular position of each human subject relative to the computer vision subsystem. The identifying information in the received RF signals and the AoA of the received RF signals is fused with the determined angular position of each human subject from the computer vision subsystem so that each human subject is identified, and the angular position of each human subject is known.

The camera may generate three-dimensional image information. The three-dimensional image information may include video image information. The image information may include video image information. The identifying of one or more human subjects may include skeleton tracking. The fusing may occur by correlating AoA and CV with machine learning support vector machines. The one or both of the determining the AoA of the received RF signals and the determining of the angular position of each human subject may be performed using a static nearest neighbors algorithm. The one or both of the determining the AoA of the received RF signals and the determining of the angular position of each human subject may be performed using path correlation.

The computer vision subsystem may include a second camera to allow the system to re-identify the one or more human subjects in a second scene that does not overlap with the first scene. The computer vision subsystem may include a second camera to allow the system to re-identify the one or more human subjects in a second scene that does overlap with the first scene. The computer vision subsystem may include a second camera to allow the system to re-identify the one or more human subjects and wherein the re-identification may be performed in part with AoA of received RF signals.

The determining of angular position of each human subject relative to the computer vision subsystem may further include determining the distance of each human subject from the computer vision subsystem so as to determine the three-dimensional location of each subject relative to the computer vision subsystem. Depth information about each human subject may be obtained by using RSSI. The RF signals received by the at least one electronic device may include BLE signals. IMU data about movement of the at least one electronic device may be provided in the RF signals received therefrom and used in the fusing and identifying.

Also disclosed is a method for identifying and tracking the location of human subjects. The method includes RF signals from electronic devices associated with one or more individuals are received; the angles of arrival and the relative signal strengths of the RF signals are determined; identification information is associated with each electronic device; images are obtained of a scene and the presence and location of one or more humans are detected; and the identification information associated with the electronic devices is then associated with the one or more humans detected in the images.

Also disclosed is a system for identifying and tracking the location of human subjects. The system includes an RF receiver subsystem that includes a phased array antenna of multiple antenna elements, wherein the RF receiver subsystem receives RF signals emitted from at least one electronic device worn or carried by a human subject, the RF receiver subsystem detecting identifying information in the received RF signals from the human subject so as to be able to distinguish the human subject from other human subjects, and the RF receiver subsystem determining the Angle of Arrival (AoA) of the received RF signals. The system also includes a computer vision subsystem that includes at least one camera to generate image information based on a scene viewed by the camera, the computer vision subsystem processing the image information to identify one or more human subjects in the scene, and to determine the angular position of each human subject relative to the computer vision subsystem. The identifying information in the received RF signals and the AoA of the received RF signals is fused with the determined angular position of each human subject from the computer vision subsystem so that each human subject is identified and the angular position of each human subject is known. One or both of the determining the AoA of the received RF signals and the determining of the angular position of each human subject is performed using at least one of a static nearest neighbors algorithm and path correlation. The determining of angular position of each human subject relative to the computer vision subsystem further includes determining the distance of each human subject from the computer vision subsystem so as to determine the three-dimensional location of each subject relative to the computer vision subsystem.

The identifying of one or more human subjects may include skeleton tracking. The fusing may occur by correlating AoA and CV with machine learning support vector machines. The computer vision subsystem may include a second camera to allow the system to re-identify the one or more human subjects and wherein the re-identification is performed in part with AoA of received RF signals.

DETAILED DESCRIPTION

Figure 1:
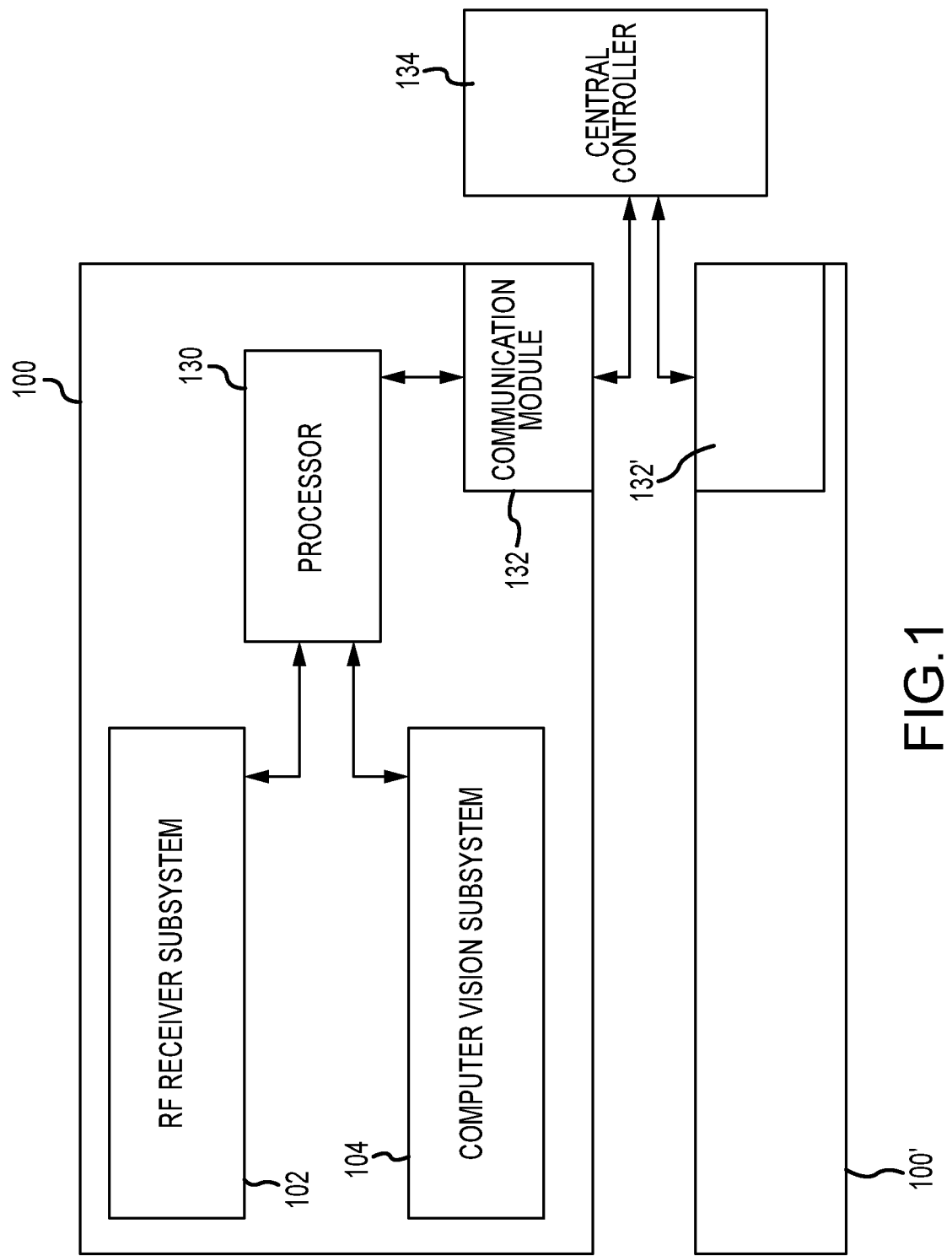
FIG. 1 is a block diagram of a sensing system as disclosed herein.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

Generally, disclosed herein is a system for precisely tracking the time-varying location of individuals (e.g., visitors to a theme or amusement park) by combining angular information about the angles from which radio signals are received (Angle of Arrival (AoA) information) with precise positional information of human subjects as captured by a computer vision system. These techniques can be used to locate and identify a mobile phone or any other device that transmits RF. To some extent, the techniques herein assume that a high percentage of park visitors above a certain age have an operating mobile phone with them. The techniques can also be used to locate and identify a person assuming they are carrying such a phone. They can allow a person to make gestures with the RF transmitter and detect and/or verify the location and motion of those gestures independently of the device. They can differentiate the same gestures based on different location locations for further interaction purpose purposes.

There are many possible variations on this arrangement. Bluetooth Low Energy (BLE) is used as merely an example in many of the embodiments discussed herein. However, any other type of radio signal could also be used, as could other types of electromagnetic radiation, including noise signals produced by most electronic devices. Some non-limiting examples are Bluetooth, Wi-Fi, and RF signals emitted by worn or held bands or other electronic devices. Further, the user may voluntarily configure their phone to emit BLE signals for use by the systems described herein. In addition, there may be an app or other functionality on the mobile phone that controls information encoded in the BLE signals. For example, the information encoded in the BLE signals could include identifying information particular to an individual. The identifying information could identify the name of the individual or it could just include a unique identifier but not identify the name of the individual.

An exemplary system 100 for precisely tracking the time-varying location of individuals as described herein is shown in block diagram format in FIG. 1. The system 100 may include an RF receiver subsystem 102 and a computer vision subsystem 104. Information determined by each of the subsystems 102,104 may be provided to a processor 130 for combining the information therefrom. The combining of the information may include using machine learning support vector machines or other approaches to do correlation between the RF AoA signals and the images from the computer vision subsystem 104. Information from the processor 130 may be provided to a communication module 132 for communication to a central controller 134 or other device or a communication network. There may be one or more other systems 100' that perform similar functions and also communication externally via a communication module 132'. It should be understood that the processor 130 could be included within either of the subsystems 102 or 104 or that some or all of the processing performed in the processor 130 could be performed in the central controller 134 or in some other sort of centralized manner.

Figure 2:
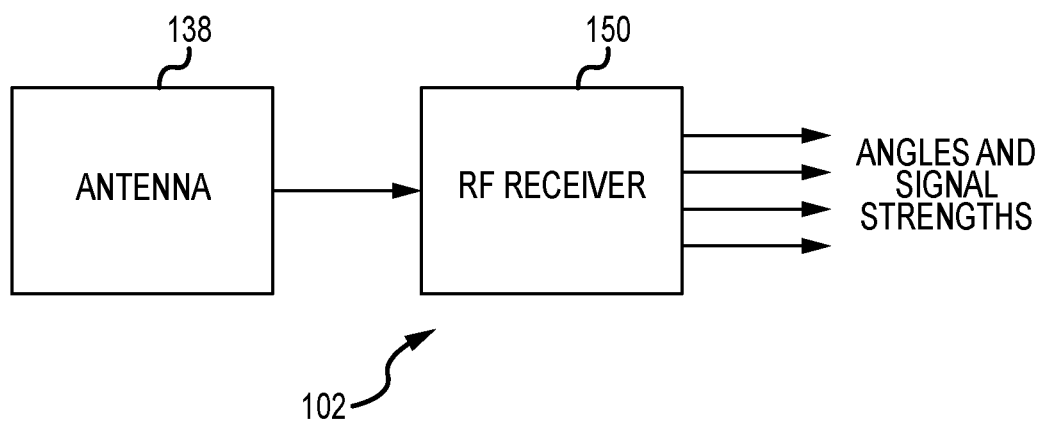
FIG. 2 is a block diagram of an RF receiver subsystem as disclosed herein.
Figure 6:
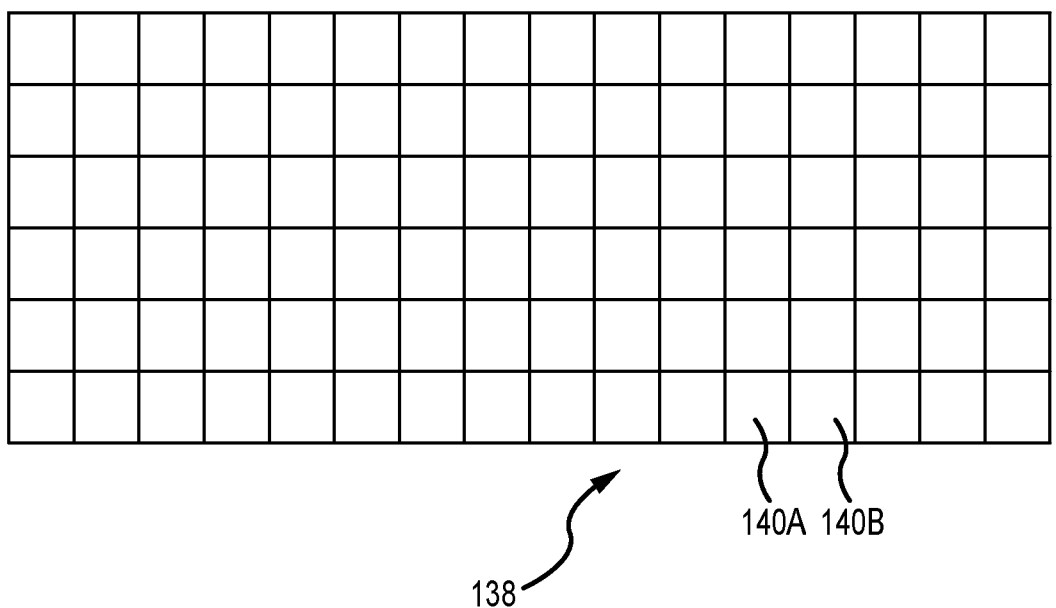
FIG. 6 shows a phased array antenna component of the systems disclosed herein.

FIG. 2 shows further details of the RF receiver subsystem 102. The subsystem 102 may include a phased array antenna 138 as shown in FIG. 6. The antenna 138 may include a plurality of individual antenna elements 140A, 140B that are arranged into any suitable array. The antenna 138 is coupled to an RF receiver 150 that is able to resolve the various RF signals (e.g., BLE signals emitted by the phone) received by the antenna into discrete signals from a determined angle and a determined signal strength.

Figure 3:
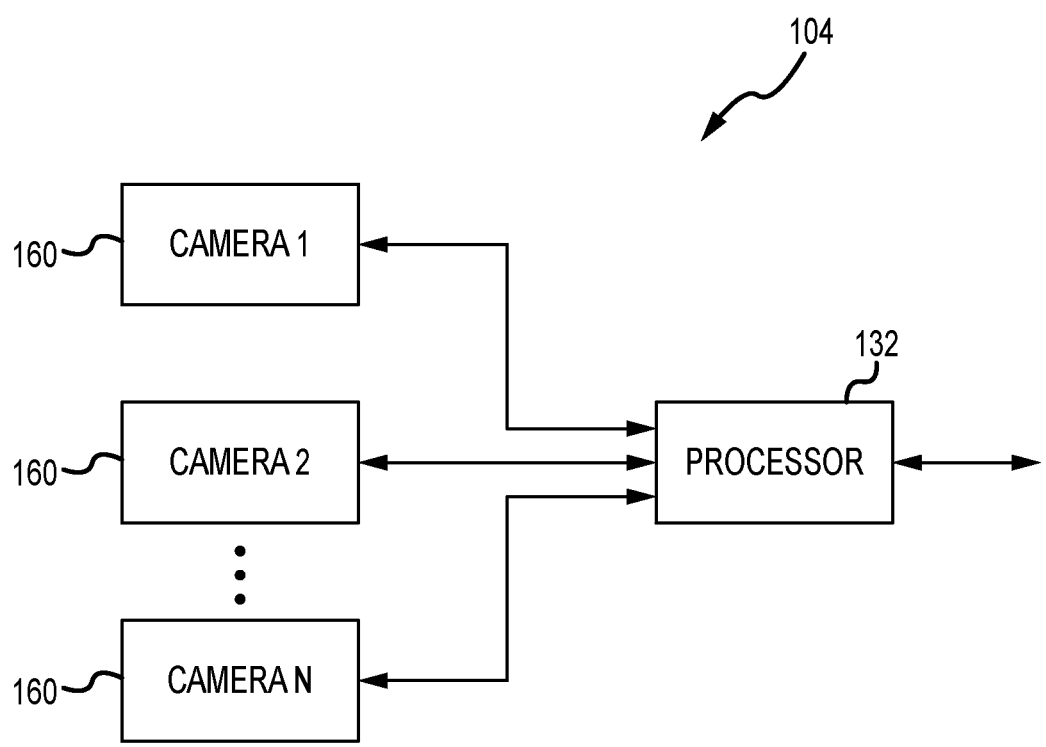
FIG. 3 is a block diagram of a computer vision subsystem as disclosed herein.

It should be understood that the antenna 138 need not be a phased array receiver, as long as the RF receiver subsystem 102 can resolve received RF signals by the angle from which they are received. Any other hardware implementation that provides such functionality could be employed. The subsystem 102 may receive and record all RF traffic in the vicinity and digitally calculate the phase difference of each wave. By combining multiple receivers, it is possible to precisely triangulate the location of RF transmitters (e.g., within 30 cm or better). The subsystem is passive in that it does not communicate with the RF transmitters FIG. 3 shows further details of the computer vision subsystem 104. The subsystem 104 may include one camera 160 or up to N different cameras 160. The images captured by the camera(s) 160 are provided to a processor 162. The camera 160 may be any of a variety of types of cameras, whether two-dimensional or three-dimensional. Some non-limiting examples are RGB-D cameras and Kinect cameras.

Computer vision algorithms used herein may detect each unknown person's motion (including hands or body movement) to associate each individual's BLE devices (e.g., smartwatch, smartphone, or other) motion observed by the RF receiver subsystem 102.

To do so, a computer vision algorithm may search each video frame to localize the people first. Once those unknown people are localized, the algorithm may further segment specific key-points on the body of each unknown person. Those may include (for example) 20 key-points such as hands, wrists, elbows, shoulders, shoulder-center, head, spine, hips, hip-center, knees, angles, and feet. Those key-points can compose each unknown person's skeleton. By continuously tracking each key-point motion in 3-D space over time, the computer vision can observe hand(s), legs, or even body motion to see whether those motions can be associated to a BLE smartphone or smartwatch motion. Further detail on such algorithms can be found at websites such as Eternal Coding's pages about algorithms for Kinect for Windows SDK.

As can be appreciated, two people in the camera's field-of-view could hold their smartphones and walk around in front of the system 100. The computer vision algorithm would start to localize each key-point on each unknown person and construct a skeleton as discussed above. Then, when one person is moving his hand and walking toward the right, the smartphone motion has similar behavior. Hence, the system can associate the identification information from the smartphone with the unknown person appearing in the camera system. Similarly, the other person is identified by associating his skeleton with his moving direction as well as hand motion with the smartphone's motion as seen by the AoA receiver.

Further detail is provided here on how the information from the two subsystems 102 and 104 can be combined together. This is illustrated in two examples, a first in which people are completely still without any motion or movement in their hand or location. A second example includes different degrees of motion introduced when people are walking or moving their hands.

In the first example, when people are still, the ID association includes using the nearest distance approach to assign ID with people. For example, a user may appear in the camera subsystem at 60 degrees, while there are multiple phones that appear at 45 degrees, 85 degrees, and 120 degrees based on AoA receiver. Then, the ID will use the smartphone which is at 45 degrees calculated from the AoA receiver to associate with the user as it is the nearest neighbor.

In the second example, when motions are introduced from each person's body movement or hand waving, the angle-of-arrival for each smartphone over time can construct a unique motion trace. Then, the computer will look at each key-point from each unknown person to see which key-point trace (over time) is closest to the motion trace of the smartphone. As the machine does not know whether the smartphone is in the individual's pocket or is held in her hand, the machine compares all the body key-point traces individually to do the ID association. This association process can be done by using support vector machine or neural network approaches after giving enough training data to assist machine learning in the correlation between key-points and the BLE device's traces.

Figure 4A:
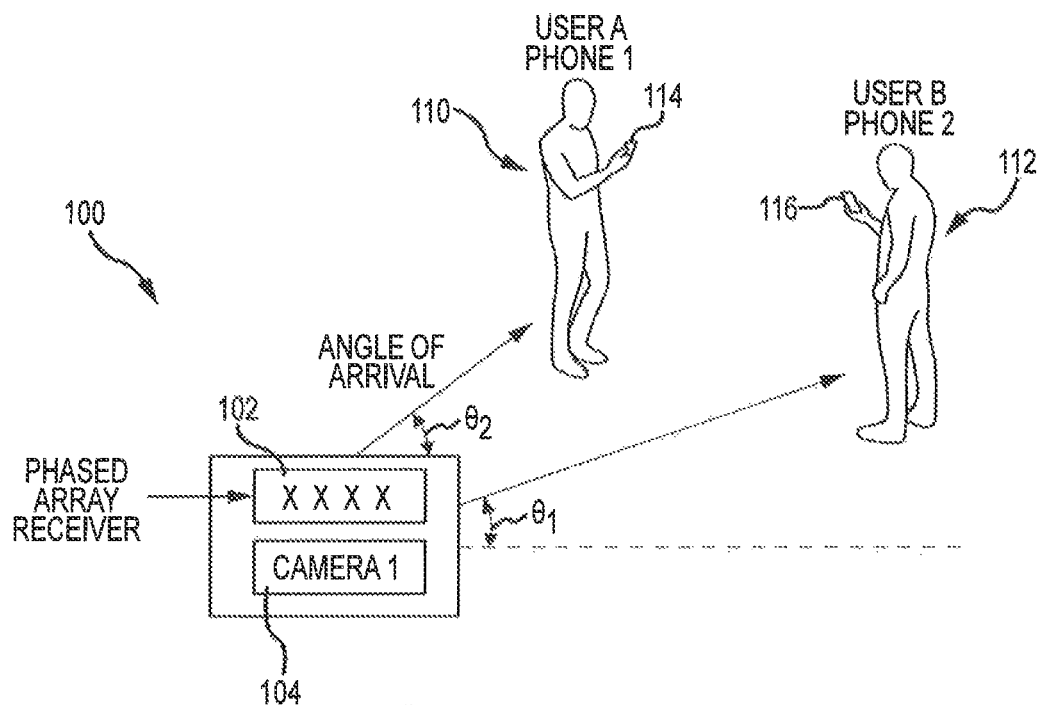
FIGS. 4A-4C are representations of a scenario with two human subjects in proximity to a sensing system as disclosed herein, with FIG. 4A being an isometric view, FIG. 4B being a top plan view, and FIG. 4C being a side elevation view.
Figure 4B:
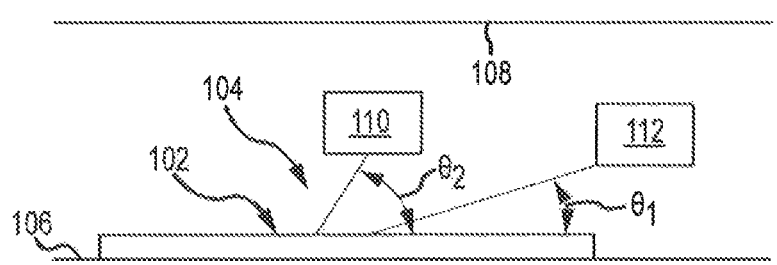
Figure 4C:
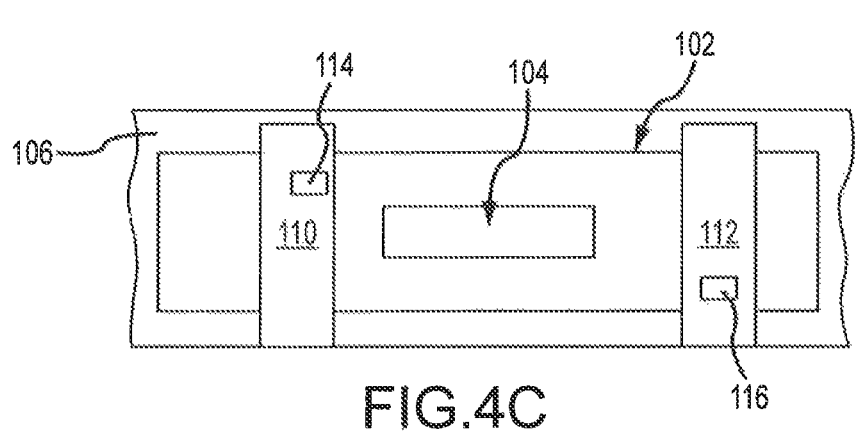

Further detail about the use of the system 100 can be seen in FIGS. 4A-4C, with FIG. 4A being an isometric view, FIG. 4B being a top plan view, and FIG. 4C being a side elevation view. The system 100 includes the RF receiver subsystem 102, which includes a phased array antenna and RF receiver. The system 100 also includes the computer vision subsystem 104, which includes one or more cameras. The system 100 may or may not be mounted on a wall of a room, hallway, building, or other. A pair of human subjects or individuals, User A 110 and User B 112, may be located in the vicinity of the system 100, and each individual may carry a mobile phone, Phone 1 114 and Phone 2 116, respectively.

The system 100 may be capable of precisely determining the angle ($\theta_1$ or $\theta_2$) between the system 100 and the mobile phone 114 or 116. This may be referred to as the angular position of the mobile phones 114, 116. This angular position could be an angle relative to a plane, such as the plane of the wall that the system 100 is mounted to. The angular position could be relative to a vertical axis, relative to a horizontal axis, or other. As can be seen in FIG. 4C, the mobile phones 114 and 116 may be located at two different heights relative to the floor or ground. As can be appreciated, described herein is a static nearest neighbors approach, although other approaches could be used.

IDs are assigned by the system 100 to the users/phones. The IDs are then associated with the appropriate human figure seen by the computer vision subsystem 104.

Figure 5:
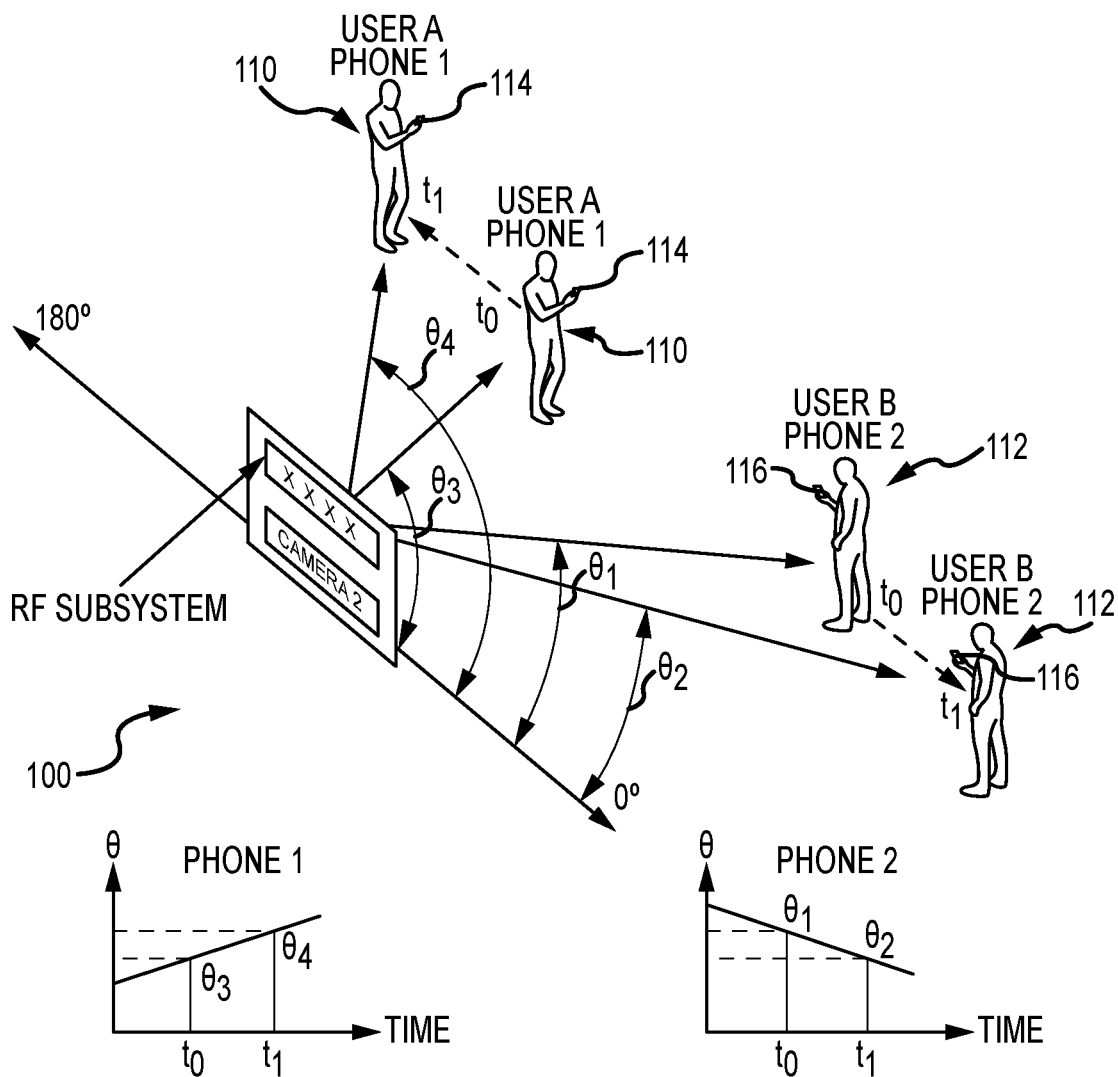
FIG. 5 is a representation of a similar scenario with two moving human subjects.

FIG. 5 shows User A 110 and User B 112 moving in different directions. A phone ID can be assigned to a corresponding user image in the camera's field of view based on the variation of the AoA signals from the RF receiver subsystem 102 and the location from an RGB-D camera of the computer vision subsystem 104. For example, the Phone 1 114 angle calculated by the RF receiver subsystem 102 is increasing (from times $t_0$ to $t_1$) while User A 110 is moving toward the camera's left side. Since User A 110 and Phone 1 114 both have consistent motion/direction, as seen by the RF receiver subsystem 102 and the computer vision subsystem 104, the system can assign the ID of Phone 1 114 to the User A 110 image from the computer vision subsystem 104. Similarly, the angle of Phone 2 116 is decreasing from times $t_0$ to $t_1$, which matches the computer vision subsystem 104 view of User B 112 moving in a direction to the camera's right. Therefore, the ID information obtained from the Phones 114 and 116 can be correctly linked to the Users 110 and 112. As can be appreciated, described herein is a path correlation approach, although other approaches could be used.

Figure 7:
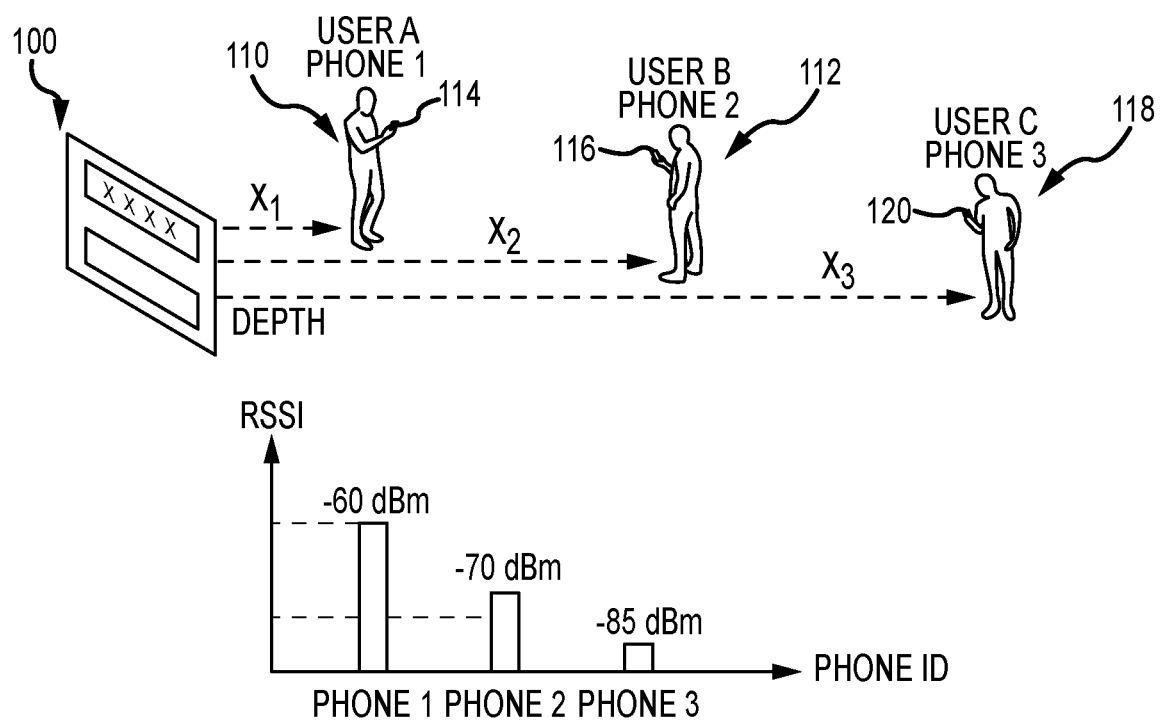
FIG. 7 is a representation of a similar scenario with three human subjects located at different distances from the system and with correspondingly different signal strengths received therefrom.

FIG. 7 shows User A 110, User B 112, and User C 120, each standing at a different distance from the system 100. Each of the users has a mobile phone, Phone 1 114, Phone 2 116, and Phone 3 120, respectively. The RF receiver subsystem 102 uses received signal strength indication (RSSI) to measure the distance (depth) of the respective phone from the location of the system 100. A graph is shown of the respective RSSI signals of −60 dBm, −70 dBm, and −85 dBm from the phones.

Figure 8:
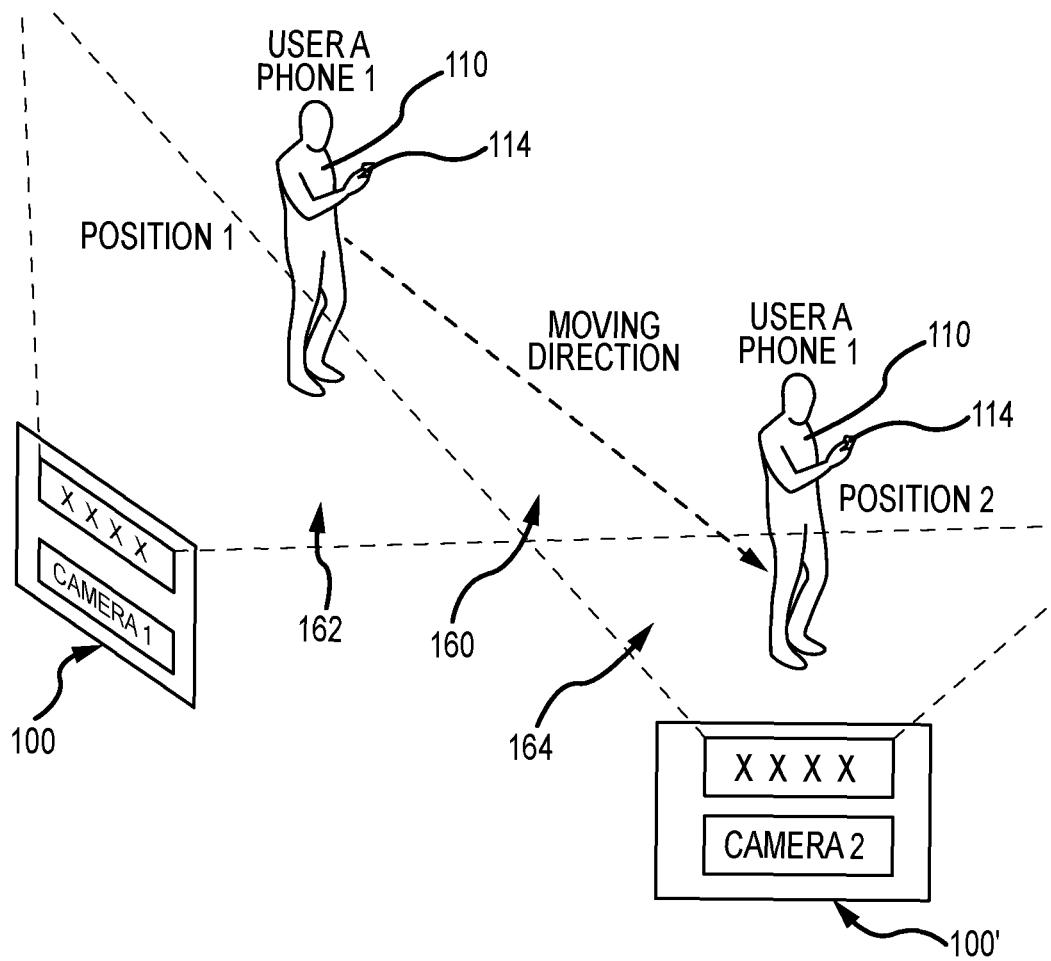
FIG. 8 is a representation of a scenario where a human subject is recognized by a second sensing system after having been previously sensed by a first system.

FIG. 8 shows system 100 and system 100' with fields of view that partially overlap each other. As can be seen, there is a physical area 160 where each of systems 100 and 100' can "see" a user. In this sense, seeing a user may include either being able to receive RF signals from a user's phone or being able to view a user with computer vision, or being able to do both. There is also an area 162 where only system 100 can see a user, and system 100' cannot. There is also an area 164 where only system 100' can see a user, and system 100 cannot. A re-identification process (i.e., assigning an ID from a phone to an unknown person image) can be either: re-doing the identification procedure by measuring a user's AoA with the user's location/motion to assign the ID; or using tracking results from another system to associate the identity. For example, in FIG. 8, User A 110 is moving away from the camera cover area of system 100 and toward the camera cover area of system 100'. A re-identification by system 100 can be done by calculating angle-of-arrival in its own RF receiver subsystem 102 to associate the location the computer vision subsystem 104 of 100'. Another approach is that the RF receiver subsystem 102 in system 100 can continuously track Phone 1 114 and report the moving direction of User A 110 to system 100'. Then, system 100' can use the information from the RF receiver subsystem 102 of system 100 to link the unknown user's appearance in the field of view of system 100' with the corresponding phone ID.

Figure 9:
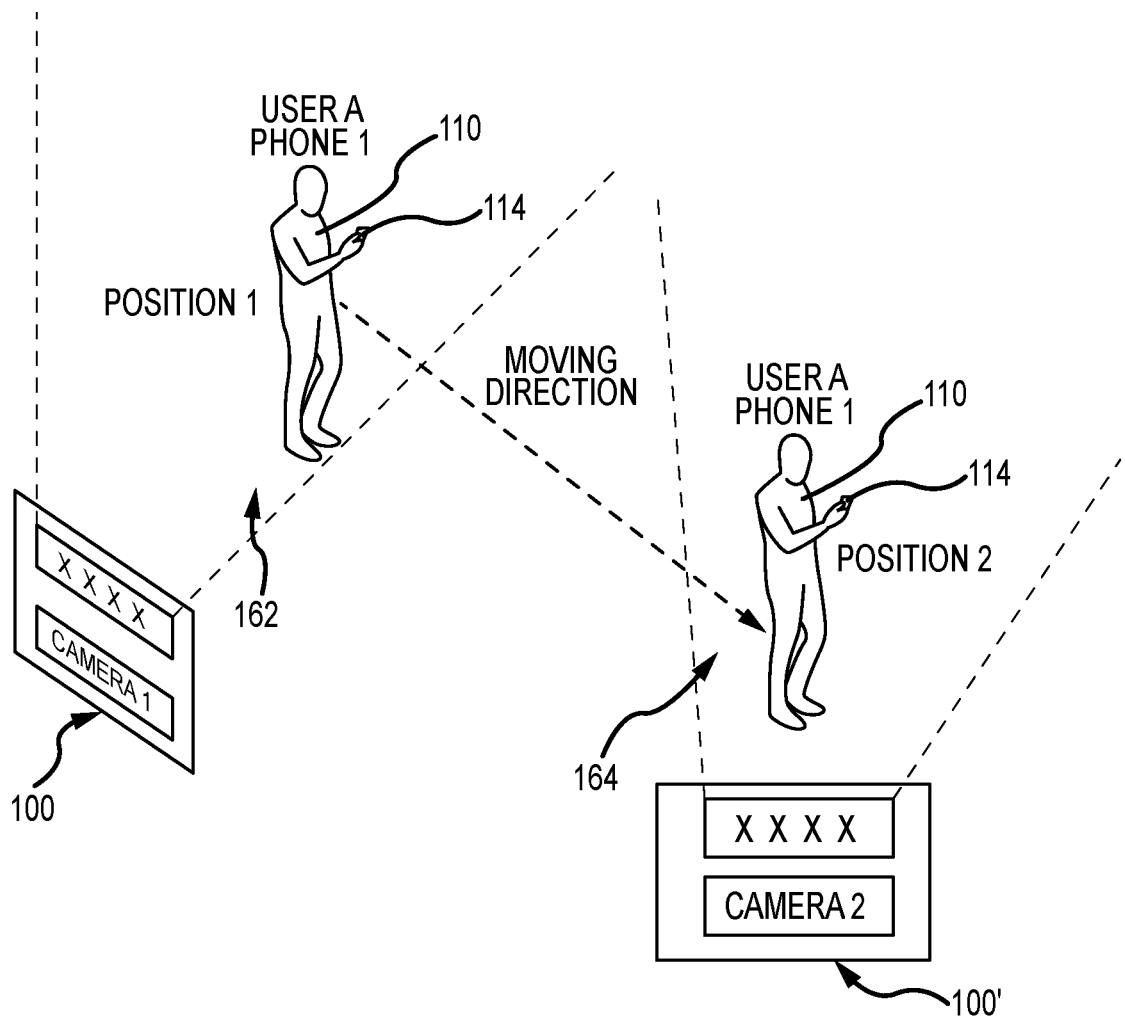
FIG. 9 is like FIG. 8, but shows a scenario where the first sensing system and the second sensing system have non-overlapping views.

FIG. 9 shows a similar arrangement as FIG. 8, but with the fields of view of systems 100 and 100' arranged in a manner so that they do not overlap with each other.

Figure 10:
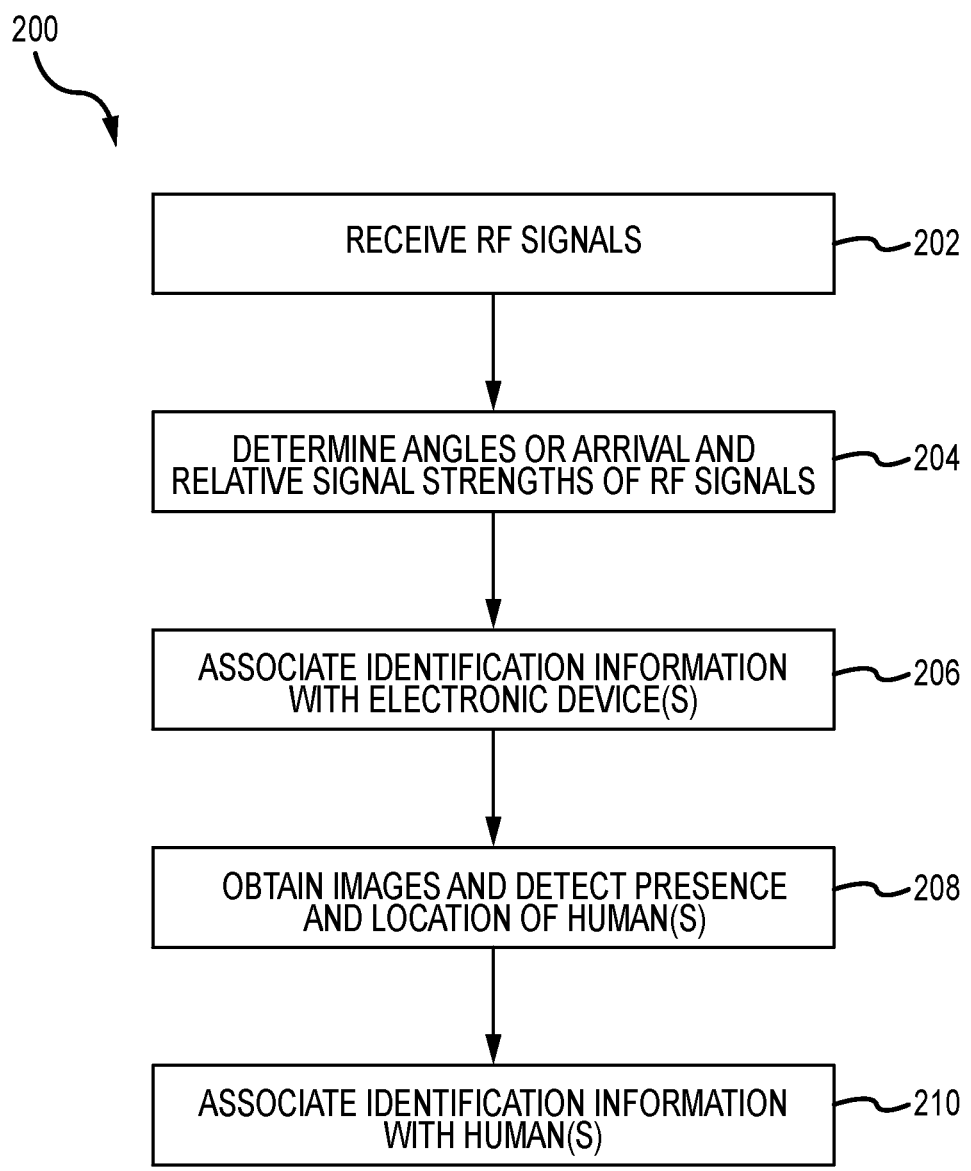
FIG. 10 is a flowchart showing methods as disclosed herein.

FIG. 10 shows a process 200 that is followed by the system described herein. It should be understood that although a particular order has been shown for the various operations in the process, an operation of a subset of operations could be performed at a different time in the process. Thus, this flowchart and this accompanying description are not intended to be limiting as to the particular order in which operations are performed. Further, the process could also be performed with any one or ones of the operations omitted or with additional operations inserted therein. As described herein, RF signals from electronic devices associated with one or more individuals are received (202). The angles of arrival and the relative signal strengths of the RF signals are determined (204). Identification information is associated (206) with each electronic device. Images are obtained of a scene and the presence and location of one or more humans are detected (208). The identification information associated with the electronic devices is then associated (210) with the one or more humans detected in the images.

One note is that everything described herein may assume a localization model where the infrastructure is trying to determine the location of a phone and human.

Another note is that one or more of the electronic devices discussed herein may internally generate IMU (inertial measurement unit) data that is supplied in its RF signals. This can aid the system 100 in providing localization as well as in recognizing gestures made by the user with the electronic device. For example, a SLAM (simultaneous localization and mapping) algorithm can be used to estimate the BLE transmitter location and orientation by mapping AoA information with IMU sensor data. A localization performance hence can be improved by using both IMU and AoA data.

Further, a user can use the same gesture to enable different interactions based on the user's location. The gestures are recognized by using IMU sensor data while the location is calculated by using RF AoA information. For example, a user next to printer can use a swipe action to connect to the nearby printer. When a user is next to a computer, he/she can use the same gesture (swipe action) to access the nearby computer. Also, a user could be prompted to make a movement or gesture and IMU data and the subsystems 102 and 104 described herein could be used to perform authentication.

The techniques herein make a difficult computer vision problem into a simpler problem (ten humans and ten phones; which one belongs to whom?). In short, our sensor fusion techniques push beyond the combination of two localization systems and use a probabilistic approach to make the phone to human assignment. Low level RF features (e.g., phase rotation) can be used to estimate the speed of the RF transmitter which can be correlated to human motion.

Other approaches have suffered from imprecise determinations of position (2-10 meters), blind spots, difficulty in set-up, and inability to track moving targets. Further, this approach does not require that a particular BLE packet be transmitted or that a particular piece of hardware be carried or that RFID readers be used.

It can be appreciated that the techniques taught herein can be used to more robustly identify identifying information associated with a guest at a theme park (e.g., Guest 392) without identifying guests by their name or other indicators that may raise privacy issues. This information could be used for example as part of an interactive game or experience the guest is participating in. It could also be used for food delivery for in-park dining, or for other purposes. Further, while the majority of descriptions herein imply that a theme park may use such systems in tracking guests, it should be understood that there may also be applications when a user wants to know precisely where they are located, and the systems herein could be used in that regard.

Various techniques can be used to improve the algorithms, systems, and methods disclosed herein. The number of antennas or antenna elements can be increased. Different antenna array patterns can be used, as can patterns with different spacing between antenna elements. Multiple BLE (or other) frequency bands can be used simultaneously to enhance performance. Algorithms can be used for determining confidence in multipath measurements. Time averaging can be used to more accurately determine angle-of-arrival.

Also, one can reuse BLE permeable packet or special data sequence (e.g., PN sequence) for multipath mitigation. For example, each BLE packet has a preamble part which is used to assist the RF (BLE) receiver in knowing what kind of BLE protocol is going to be used. The preamble is a predefined bit sequence in BLE packets, and we know what the ideal BLE waveform is, based on this predefined bit sequence. When the BLE packet suffers multipath distortion, the preamble bit sequence can be used to estimate the amount of multipath distortion, since we know how the ideal waveform looks. By comparing the distortion in the preamble bit sequence with the ideal waveform, the BLE receiver can use this information to recover the multipath packets.

If the preamble sequence is not able to recover (correct for) the multipath effect, we can even embed a special pseudorandom noise (PN) sequence which has a much longer predefined sequence than the preamble bit sequence. As we also know the ideal waveform for this predefined bit sequence (PN sequence), we can use this sequence to measure the distortion introduced in the multipath signal. Moreover, this sequence is designed in a special way such that the receiver can use it with an autocorrelation decoder approach to suppress the multipath results. Hence, the AoA calculation can be more accurate by leveraging the above signal processing techniques to remove the multipath interference.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

At this point, methods and techniques for performing such computer-implemented methods will be discussed. Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Figure 11:
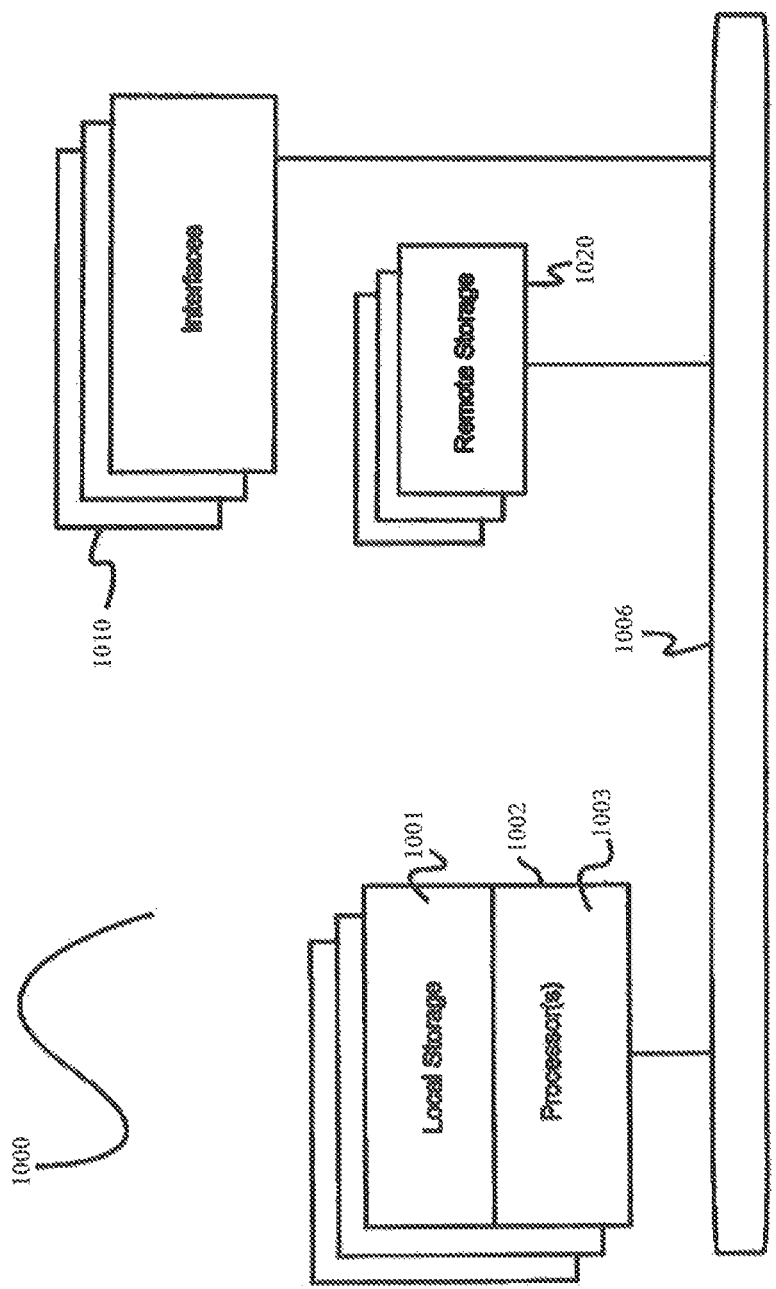
FIG. 11 is a block diagram illustrating an exemplary hardware architecture of a computing device used in an embodiment of the disclosure herein.

Referring now to FIG. 11, there is shown a block diagram depicting an exemplary computing device 1000 suitable for implementing at least a portion of the features or functionalities disclosed herein. Computing device 1000 may be, for example, any one of the computing machines listed in the previous paragraph, or indeed any other electronic device capable of executing software- or hardware-based instructions according to one or more programs stored in memory. Computing device 1000 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 1000 includes one or more central processing units (CPU) 1002, one or more graphic processing units (GPU) (not shown), one or more interfaces 1010, and one or more busses 1006 (such as a peripheral component interconnect (PCI) bus). When acting under the control of appropriate software or firmware, CPU 1002 may be responsible for implementing specific functions associated with the functions of a specifically configured computing device or machine. For example, in at least one embodiment, a computing device 1000 may be configured or designed to function as a server system utilizing CPU 1002, local memory 1001 and/or remote memory 1020, and interface(s) 1010.

In at least one embodiment, CPU 1002 may be caused to perform one or more of the different types of functions and/or operations under the control of software modules or components, which for example, may include an operating system and any appropriate applications software, drivers, and the like. CPU 1002 may include one or more processors 1003 such as, for example, a processor from one of the Intel, ARM, Qualcomm, and AMD families of microprocessors. In some embodiments, processors 1003 may include specially designed hardware such as application-specific integrated circuits (ASICs), electrically erasable programmable read-only memories (EEPROMs), field-programmable gate arrays (FPGAs), and so forth, for controlling operations of computing device 1000. In a specific embodiment, a local memory 1001 (such as non-volatile random access memory (RAM) and/or read-only memory (ROM), including for example one or more levels of cached memory) may also form part of CPU 1002. However, there are many different ways in which memory may be coupled to system 1000. Memory 1001 may be used for a variety of purposes such as, for example, caching and/or storing data, programming instructions, and the like. Similarly, in at least one embodiment, multiple processing cores of GPU may be caused to perform sequences of different steps or functions in parallel (independently and concurrently) for different parts of the image or computation.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, a graphics processing unit, stream processing unit, and any other programmable circuit.

In one embodiment, interfaces 1010 are provided as network interface cards (NICs). Generally, NICs control the sending and receiving of data packets over a computer network; other types of interfaces 1010 may for example support other peripherals used with computing device 1000. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 1010 may include ports appropriate for communication with appropriate media. In some cases, they may also include an independent processor and, in some in stances, volatile and/or non-volatile memory (e.g., RAM).

Although the system shown in FIG. 11 illustrates one specific architecture for a computing device 1000 for implementing one or more of the embodiments described herein, it is by no means the only device architecture on which at least a portion of the features and techniques described herein may be implemented. For example, architectures having one or any number of processors 1003 may be used, and such processors 1003 may be present in a single device or distributed among any number of devices. In one embodiment, a single processor 1003 handles communications as well as routing computations, while in other embodiments a separate dedicated communications processor may be provided. In various embodiments, different types of features or functionalities may be implemented in a system that includes a client device (such as a tablet device or smartphone running client software) and server systems (such as a server system described in more detail below).

Regardless of network device configuration, the system may employ one or more memories or memory modules (such as, for example, remote memory block 1020 and local memory 1001) configured to store data, program instructions for the general-purpose network operations, or other information relating to the functionality of the embodiments described herein (or any combinations of the above). Program instructions may control execution of or comprise an operating system and/or one or more applications, for example. Memory 1020 or memories 1001, 1020 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 12:
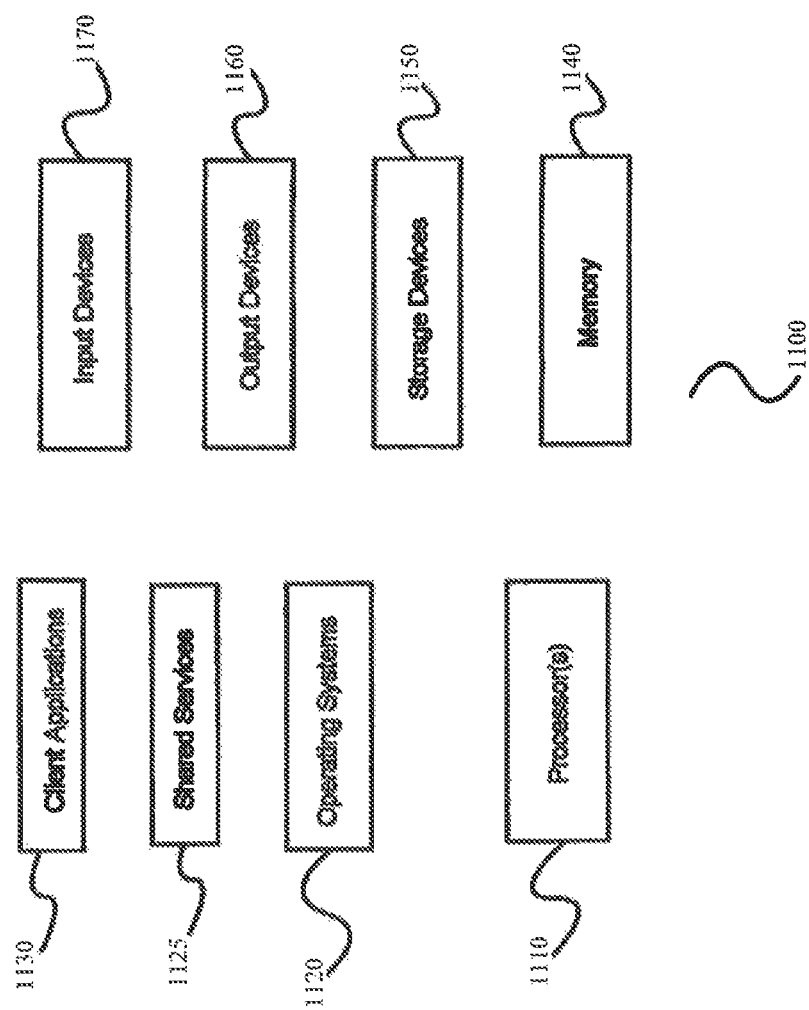
FIG. 12 is a block diagram illustrating an exemplary logical architecture for a client device, according to an embodiment of the disclosure herein.

In some embodiments, systems may be implemented on a standalone computing system. Referring now to FIG. 12, there is shown a block diagram depicting a typical exemplary architecture of one or more embodiments or components thereof on a standalone computing system. Computing device 1100 includes processors 1110 that may run software that carry out one or more functions or applications of embodiments, such as for example a client application 1130. Processors 1110 may carry out computing instructions under control of an operating system 1120 such as, for example, a version of Microsoft's Windows™ operating system, Apple's Mac OS/X or iOS operating systems, some variety of the Linux operating system, Google's Android™ operating system, or the like. In many cases, one or more shared services 1125 may be operable in system 1100, and may be useful for providing common services to client applications 1130. Services 1125 may for example be Windows™ services, user-space common services in a Linux environment, or any other type of common service architecture used with operating system 1110. Input devices 1170 may be of any type suitable for receiving user input, including for example a keyboard, touchscreen, microphone (for example, for voice input), mouse, touchpad, trackball, or any combination thereof. Output devices 1160 may be of any type suitable for providing output to one or more users, whether remote or local to system 1100, and may include for example one or more screens for visual output, speakers, printers, or any combination thereof. Memory 1140 may be random-access memory having any structure and architecture known in the art, for use by processors 1110, for example to run software. Storage devices 1150 may be any magnetic, optical, mechanical, memristor, or electrical storage device for storage of data in digital form. Examples of storage devices 1150 include flash memory, magnetic hard drive, CD-ROM, and/or the like.

Figure 13:
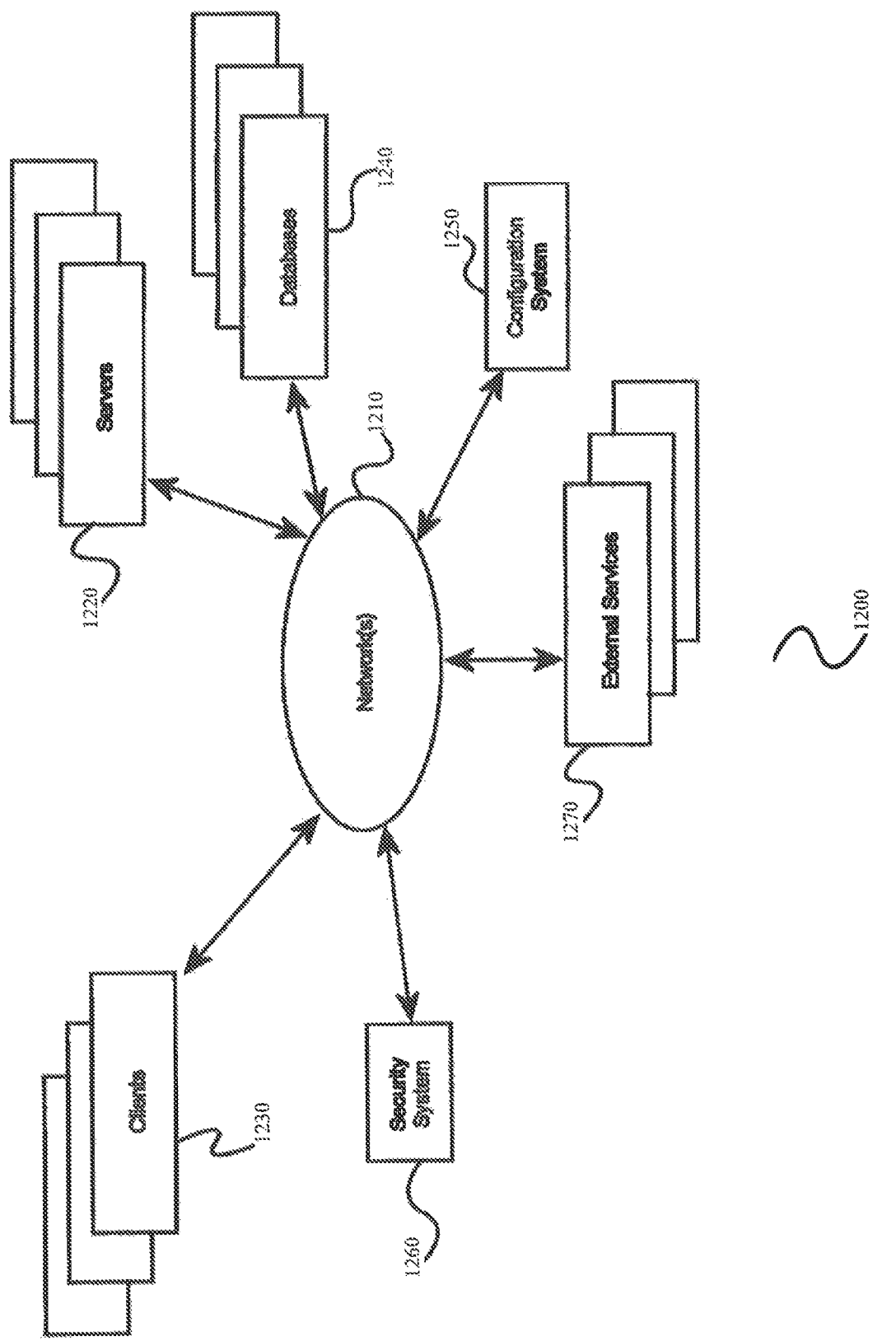
FIG. 13 is a block diagram illustrating an exemplary architectural arrangement of clients, servers, and external services, according to an embodiment of the disclosure herein.

In some embodiments, systems may be implemented on a distributed computing network, such as one having any number of clients and/or servers. Referring now to FIG. 13, there is shown a block diagram depicting an exemplary architecture for implementing at least a portion of a system 1200 according to an embodiment on a distributed computing network. According to the embodiment, any number of clients 1230 may be provided. Each client 1230 may run software for implementing client-side portions of the embodiments and clients may comprise a system 1100 such as that illustrated in FIG. 12. In addition, any number of servers 1220 may be provided for handling requests received from one or more clients 1230. Clients 1230 and servers 1220 may communicate with one another via one or more electronic networks 1210, which may be in various embodiments any of the Internet, a wide area network, a mobile telephony network, a wireless network (such as WiFi, Wimax, and so forth), or a local area network (or indeed any network topology known in the art; no one network topology is preferred over any other). Networks 1210 may be implemented using any known network protocols, including for example wired and/or wireless protocols.

In addition, in some embodiments, servers 1220 may call external services 1270 when needed to obtain additional information, or to refer to additional data concerning a particular call. Communications with external services 1270 may take place, for example, via one or more networks 1210. In various embodiments, external services 1270 may comprise web-enabled services or functionality related to or installed on the hardware device itself. For example, in an embodiment where client applications 1130 are implemented on a smartphone or other electronic device, client applications 1130 may obtain information stored in a server system 1220 in the cloud or on an external service 1270 deployed on one or more of a particular enterprise's or user's premises.

In some embodiments, clients 1230 or servers 1220 (or both) may make use of one or more specialized services or appliances that may be deployed locally or remotely across one or more networks 1210. For example, one or more databases 1240 may be used or referred to by one or more embodiments. It should be understood by one having ordinary skill in the art that databases 1240 may be arranged in a wide variety of architectures and using a wide variety of data access and manipulation means. For example, in various embodiments one or more databases 1240 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments may make use of one or more security systems 1260 and configuration systems 1250. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 1260 or configuration system 1250 or approach is specifically required by the description of any specific embodiment.

In various embodiments, functionality for implementing systems or methods may be distributed among any number of client and/or server components. For example, various software modules may be implemented for performing various functions, and such modules can be variously implemented to run on server and/or client components.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

I claim:

1. A system for identifying and tracking the location of human subjects, comprising:
    an RF receiver subsystem that includes a phased array antenna of multiple antenna elements, wherein the RF receiver subsystem receives RF signals emitted from a plurality of electronic devices each being worn or carried by a human subject, the RF receiver subsystem detecting identifying information in the received RF signals and assigning an identifier (ID) to each of the electronic devices based on the identifying information, and the RF receiver subsystem determining the Angle of Arrival (AoA) of the received RF signals; and
    a computer vision subsystem that includes at least one camera to generate image information based on a scene viewed by the camera, the computer vision subsystem processing the image information to locate one or more human subjects in the scene, and to determine the angular position of each of the one or more human subjects relative to the computer vision subsystem;
    wherein the identifying information in the received RF signals and the AoA of the received RF signals are fused with the determined angular position of each of the one or more human subjects from the computer vision subsystem based on a probability, determined by comparing the AoA of the received signals to the angular position of each of the one or more human subjects, that one of the electronic devices and one of the one or more human subjects are in a matching location so that each ID assigned to the electronic devices is associated with a specific one of the one or more human subjects and the angular position of each of the one or more human subjects is known.

2. A system as defined in claim 1, wherein the camera generates three-dimensional image information.

3. A system as defined in claim 2, wherein the three-dimensional image information includes video image information.

4. A system as defined in claim 1, wherein the image information includes video image information.

5. A system as defined in claim 1, wherein the identifying of one or more human subjects includes skeleton tracking.

6. A system as defined in claim 1, wherein the fusing occurs by correlating AoA and CV with machine learning support vector machines.

7. A system as defined in claim 1, wherein fusing of the AoA of the received signals and the determined angular position of each of the one or more human subjects to associate each of the IDs with a specific one of the one or more human subjects is performed using a static nearest neighbors algorithm.

8. A system as defined in claim 1, wherein fusing of the AoA of the received signals and the determined angular position of each of the one or more human subjects to associate each of the IDs with a specific one of the one or more human subjects is performed using path correlation.

9. A system as defined in claim 1, wherein the computer vision subsystem includes a second camera to allow the system to re-identify the one or more human subjects in a second scene that does not overlap with the first scene.

10. A system as defined in claim 1, wherein the computer vision subsystem includes a second camera to allow the system to re-identify the one or more human subjects in a second scene that does overlap with the first scene.

11. A system as defined in claim 1, wherein the computer vision subsystem includes a second camera to allow the system to re-identify the one or more human subjects and wherein the re-identification is performed in part with AoA of received RF signals.

12. A system as defined in claim 1, wherein the determining of angular position of each human subject relative to the computer vision subsystem further includes determining the distance of each human subject from the computer vision subsystem so as to determine the three-dimensional location of each subject relative to the computer vision subsystem.

13. A system as defined in claim 1, wherein depth information about each human subject is obtained by using RSSI.

14. A system as defined in claim 1, wherein the RF signals received by the at least one electronic device include BLE signals.

15. A system as defined in claim 1, wherein IMU data about movement of the at least one electronic device is provided in the RF signals received therefrom and used in the fusing and identifying.

16. A method for identifying and tracking the location of human subjects, comprising:
    RF signals from electronic devices associated with one or more individuals are received;
    the angles of arrival and the relative signal strengths of the RF signals are determined;
    assigning identification information to each of the electronic devices;
    images are obtained of a scene and the presence and location of one or more humans are detected;
    processing the images to determine an angular position for each of the one or more humans in the scene and without identifying any of the one or more humans by their name; and
    the identification information associated with the electronic devices is then associated with the one or more humans detected in the images after pairing one of the angles of arrival with one of the angular positions of the one or more humans based on a probability, determined by comparing the angles of arrival of the received signals to the angular position of the one or more human, that one of the electronic devices and one of the one or more humans are in a matching location so the identification information assigned to each of the electronic devices is associated with a specific one of the one or more humans and the angular position of the one or more humans is known.

17. A system for identifying and tracking the location of human subjects, comprising:
an RF receiver subsystem that includes a phased array antenna of multiple antenna elements, wherein the RF receiver subsystem receives RF signals emitted from a plurality of electronic devices each being worn or carried by a human subject, the RF receiver subsystem detecting identifying information in the received RF signals, and the RF receiver subsystem determining the Angle of Arrival (AoA) of the received RF signals and assigning an ID to each of the electronic devices based on the detected identifying information; and
a computer vision subsystem that includes at least one camera to generate image information based on a scene viewed by the camera, the computer vision subsystem processing the image information to locate one or more human subjects in the scene and the computer vision subsystem processing the image information to generate the angular position of each of the one or more human subjects relative to the computer vision subsystem;
wherein the AoA of the received RF signals is processed with the generated angular position of each of the one or more human to associate each of the IDs with one of the one or more human subjects;
wherein the processing of the AoA of the received RF signals and the generated angular positions is performed using at least one of a static nearest neighbors algorithm and path correlation;
wherein the identifying information in the received RF signals and the AoA of the received RF signals are associated with the determined angular position of each of the one or more human subjects from the computer vision subsystem based on a probability, determined by comparing the AoA of the received RF signals to the angular position of each of the one or more human subjects, that one of the electronic devices and one of the one or more human subjects are in a matching location; and
wherein the system further determines the distance of each human subjects from the computer vision subsystem and determines the three-dimensional location of each subject relative to the computer vision subsystem based on the determined distance.

18. A system as defined in claim 17, wherein the identifying of one or more human subjects includes skeleton tracking.

19. A system as defined in claim 17, wherein the fusing occurs by correlating AoA and CV with machine learning support vector machines.

20. A system as defined in claim 17, wherein the computer vision subsystem includes a second camera to allow the system to re-identify the one or more human subjects and wherein the re-identification is performed in part with AoA of received RF signals.

* * * * *